United States Patent
Storer

[19]

[11] Patent Number: 5,869,772
[45] Date of Patent: Feb. 9, 1999

[54] VORTEX FLOWMETER INCLUDING CANTILEVERED VORTEX AND VIBRATION SENSING BEAMS

[76] Inventor: William James A. Storer, 2273 Evergreen Pl., Loveland, Colo. 80538

[21] Appl. No.: 757,464

[22] Filed: Jun. 24, 1997

[51] Int. Cl.$^6$ ........................................................ G01F 1/32
[52] U.S. Cl. ........................................ 73/861.24; 73/861.22
[58] Field of Search ............................ 73/861.22, 861.23, 73/861.24

[56] References Cited

U.S. PATENT DOCUMENTS

| | | | |
|---|---|---|---|
| 1,935,445 | 11/1933 | Heinz . | |
| 4,069,708 | 1/1978 | Fussell, Jr. . | |
| 4,181,020 | 1/1980 | Herzl . | |
| 4,201,084 | 5/1980 | Ito et al. | 73/861.22 |
| 4,248,098 | 2/1981 | Sawayama et al. . | |
| 4,526,040 | 7/1985 | Matsubara | 73/861.24 |
| 4,625,564 | 12/1986 | Murakami et al. | 73/861.24 |
| 4,627,295 | 12/1986 | Matsubara et al. | 73/861.24 |
| 4,716,770 | 1/1988 | Herzog | 73/861.24 |
| 4,727,756 | 3/1988 | Lew | 73/861.24 |
| 4,776,222 | 10/1988 | Lew | 73/861.22 |

(List continued on next page.)

FOREIGN PATENT DOCUMENTS

| | | |
|---|---|---|
| 0 100 931 | 2/1984 | European Pat. Off. . |
| 0 110 321 | 6/1984 | European Pat. Off. . |
| 0 144 937 | 6/1985 | European Pat. Off. . |
| 0 547 577 | 6/1993 | European Pat. Off. . |
| 28 27 985 | 5/1979 | Germany . |
| 141-352 | 4/1980 | Germany . |
| 158-673 | 1/1983 | Germany . |
| 204-152 | 11/1983 | Germany . |
| 39 06 481 | 9/1989 | Germany . |
| 39 08 464 | 9/1989 | Germany . |
| 39 08 868 | 9/1989 | Germany . |
| 57-48610 (A) | 3/1982 | Japan . |
| 57-54809 (A) | 4/1982 | Japan . |
| 59-19813 (A) | 2/1984 | Japan . |
| 4-331322 (A) | 1/1991 | Japan . |
| 3-238321 (A) | 10/1991 | Japan . |
| 3-238322 (A) | 10/1991 | Japan . |
| 396555 | 1/1974 | U.S.S.R. . |
| 1811582 | 4/1993 | U.S.S.R. . |
| 2 108 268 | 5/1993 | United Kingdom . |

OTHER PUBLICATIONS

(Promotional Materials) Vortex PhD—Vortex Shedding Flowmeter, The Complete Solution For Flow Measurement, vol. I, EMCO Flowmeters (no date).
(Promotional Materials) General Specifications, Model YF100 Vortex Flowmeters, Yokogawa Electric Corporation (no date).
"Vortex Flowmeters: Designs and Applications", Roger Van Nuis and Mohamed Khalifa, Plant Engineering, Mar. 1991.
(Promotional Materials) Vortex Flowmeters, The Foxboro Company.
(Promotional Materials) Model 8800 Smart Vortex Flowmeter, Rosemount Measurement, Rosemount, Inc. (no date).
(Promotional Materials) Vortex 4 Flowmeters, Fischer & Porter (no date).
(Promotional Materials) Flow Measurement—The Endress + Hauser Line of Vortex Shedding, Electromagnetic, and Coriolis Flowmeters, Endress + Hauser. (no date).

*Primary Examiner*—Max H. Noori

[57] ABSTRACT

A vortex flowmeter has a bluff body extending across a conduit to generate vortices in a fluid flow, and a housing mounted to the conduit. A vortex sensing beam is mounted to housing and extends in cantilever fashion from the housing into the flow path separate from the bluff body. The vortex sensing beam is for sensing external vibration and for sensing vortices shed from the bluff body. A vibration sensing beam is mounted to the housing and extends in cantilever fashion away from the vortex sensing beam. The vibration sensing beam is for sensing external vibration only. In use, the outputs from the vortex and vibration sensing beams are combined to yield a final output signal in which the effect of external vibration is reduced.

6 Claims, 9 Drawing Sheets

U.S. PATENT DOCUMENTS

| | | | |
|---|---|---|---|
| 4,791,818 | 12/1988 | Wide | 73/861.24 |
| 4,803,870 | 2/1989 | Lew | 73/861.22 |
| 4,807,481 | 2/1989 | Lew | 73/861.24 |
| 4,835,436 | 5/1989 | Lew | 73/861.24 |
| 4,854,177 | 8/1989 | Phipps et al. | 73/861.24 |
| 4,884,458 | 12/1989 | Lew | 73/861.24 |
| 4,910,994 | 3/1990 | Lew . | |
| 4,934,194 | 6/1990 | Itoh et al. | 73/861.22 |
| 4,976,156 | 12/1990 | Lew | 73/861.24 |
| 4,986,134 | 1/1991 | Lew | 73/861.24 |
| 5,003,827 | 4/1991 | Kalinoski et al. . | |
| 5,036,240 | 7/1991 | Lew . | |
| 5,076,105 | 12/1991 | Lew . | |
| 5,090,251 | 2/1992 | Lew . | |
| 5,095,760 | 3/1992 | Lew | 73/861.24 |
| 5,101,668 | 4/1992 | Lew . | |
| 5,123,285 | 6/1992 | Lew . | |
| 5,127,273 | 7/1992 | Lew . | |
| 5,186,056 | 2/1993 | Lew . | |
| 5,321,990 | 6/1994 | Lang et al. | 73/861.24 |
| 5,447,073 | 9/1995 | Kalinoski | 73/861.24 |

VORTEX FLOWMETER INCLUDING CANTILEVERED VORTEX AND VIBRATION SENSING BEAMS

TECHNICAL FIELD

This invention relates to the field of vortex flowmeters, and more particularly, to vortex flowmeters which employ means to reduce the effect of external vibration on the output signal generated by the vortex flowmeter.

BACKGROUND OF THE INVENTION

Vortex flowmeters exploit a natural phenomenon known as vortex shedding. Vortices are shed from almost any non-streamlined body placed in a flow stream. An elongate body with a symmetrical cross section placed in a flow stream will shed vortices alternately from opposite sides. These alternating vortices then travel downstream in the flow, in what is known as the "Karman vortex street", in honor of the man who discovered this phenomenon. Over a fairly broad range of flowrates, the vortex shedding frequency is proportional to the velocity of the flow stream. Therefore, by applying an appropriate scaling factor to a measurement of the vortex shedding frequency, the velocity of the flow can be determined. By measuring the temperature and pressure of the fluid flow, and by applying suitable equations, such as Boyle's law for gases, the mass flowrate of the fluid flow can be determined.

In a vortex flowmeter, a bluff body is provided to generate a Karman vortex street and the vortex shedding frequency (and hence the velocity of the flow) is measured by a sensor. The sensor typically provides an output proportional to the deflection or strain generated in the sensor by the pressure fluctuations caused by the passing vortices.

Such deflective sensors have the disadvantage that they sense external vibrations in addition to the passing vortices. External vibrations degrade the output signal from the sensor, and restrict the lower end of the useable measurement range of the flowmeter. External vibrations are caused, for example, by the operation of nearby pumps, valves, or other process machinery.

Existing flowmeters have attempted to use sophisticated signal processing electronics to extract the vortex frequency signal from the overall sensor output signal. This approach is expensive, complex, and has only had limited success.

Other flowmeters have utilized a separate sensor to detect vibration. The output from this sensor is then subtracted from the overall signal to yield a better vortex frequency signal. While this approach has been more successful, the configuration of these flowmeters have disadvantages which will become apparent when compared with the vortex flowmeter of the invention.

SUMMARY OF THE INVENTION

According to the invention there is provided a vortex flowmeter for use in a conduit defining a fluid flow path. The vortex flowmeter comprises a bluff body, a housing and vibration and vortex sensing beams. The bluff body extends across the conduit for generating vortices in the fluid flow, and the housing is fixedly or removably coupled to the conduit.

The vortex sensing beam is coupled to the housing and extends in cantilever fashion from the housing into the flow path in use. The vortex sensing beam is separate from the bluff body, and is used for sensing external vibration and for sensing vortices shed from the bluff body. The vibration sensing beam is also coupled to the housing and extends in cantilever fashion away from the vortex sensing beam. The vibration sensing beam is for sensing external vibration.

A signal obtained from the vibration sensing beam is combined with a signal obtained from the vortex sensing beam to yield an output signal in which the effect of external vibration is greatly reduced.

The significance of having the vortex sensor separate from the bluff body is that each of these components can then be specifically designed to perform their individual functions.

In order to provide good vortex shedding, a bluff body located in a conduit is required to have certain geometric properties. In particular, vortex shedding is found to be best when the width of the bluff body is approximately one quarter of the internal diameter of the conduit, and the length to width ratio of the bluff body is between one and two.

In order to meet these geometric requirements, the bluff body is required to be relatively large. This results in the bluff body having a relatively large mass and hence a low resonant frequency. In prior art flowmeters in which the vortex sensor is integral with the bluff body, this lower resonant frequency limits the usable range of the flowmeter. In particular, these prior art flowmeters are less useful in the measurement of gas flow as the vortex shedding frequencies found in gas flow measurement are much higher, typically an order of magnitude, than the shedding frequencies found in liquid flow measurement.

On the other hand, if the bluff body is made smaller and lighter in an attempt to increase the resonant frequency of the bluff body, hence to improve its sensing capabilities, it will function less well as a vortex shedder.

In the vortex flowmeter of the present invention, the vortex sensor is separate from the bluff body, allowing it to be constructed as a small, stiff and light sensor with a correspondingly high resonant frequency. The bluff body can then be optimized for vortex shedding without being concerned about the range of the vortex flowmeter being limited by the properties of the bluff body.

In the preferred embodiment of the invention, the vortex sensing beam is recessed into the housing such that in use at least a portion thereof is shielded from the fluid flow and a portion thereof projects into the fluid flow. This has the advantage that the relatively bulkier portion of the vortex sensing beam comprising the strain detecting means is shielded from the flow, while the streamlined detector tab is appropriately positioned to detect the vortex shedding. This is significant in that any non-streamlined part of the vortex sensing beam which protrudes into the flow will tend to cause secondary vortex shedding. This secondary vortex shedding will exert forces on the vortex sensing beam which are unrelated to the forces caused by the vortices shed from the bluff body, causing deterioration of the output from the vortex flowmeter. By shielding the bulkier portion of the vortex sensing beam from the fluid flow, secondary vortex shedding is reduced in the vortex flowmeter of the invention.

BRIEF DESCRIPTION OF THE DRAWINGS

For a fuller understanding of the present invention, reference is made to the accompanying drawings in the following detailed description of the Best Mode of Carrying Out the Present Invention. In the drawings.

BEST MODE FOR CARRYING OUT THE INVENTION

As vortex flowmeters are well known in the art, in order to avoid confusion while enabling those skilled in the art to practice the invention, this specification omits many details with respect to known items.

Figure 1:
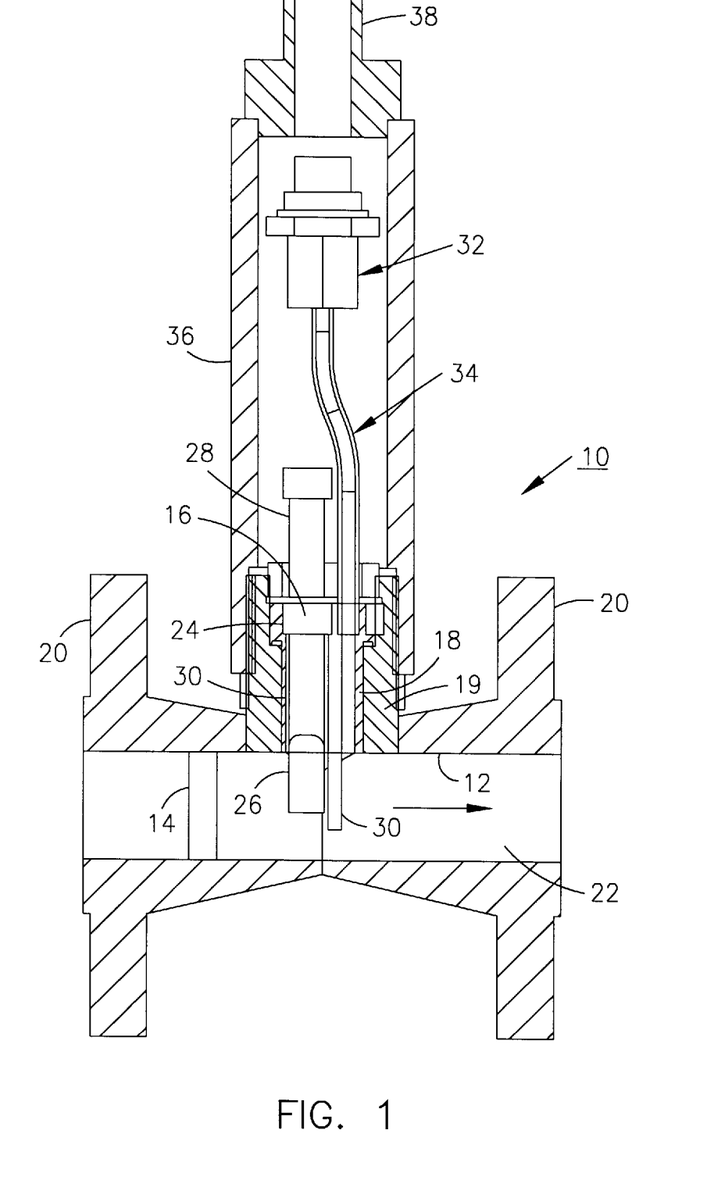
FIG. 1 is a longitudinal partial cross-sectional view of a conduit incorporating a vortex flowmeter in accordance with the invention.

Referring now to the drawings, FIG. 1 illustrates the best mode vortex flowmeter according to invention. The vortex flowmeter, generally indicated by the numeral 10, is fitted into a conduit 12. The vortex flowmeter 10 comprises a bluff body 14 extending across the conduit, an elongated sensor tube 16 and a housing 18. The housing 18 is coupled to the conduit by means of a turret 19, but it will be appreciated that the housing 18 could be mounted directly to the conduit 12. Flanges 20 extend transversely to the conduit 12 for mounting the vortex flowmeter 10 in a fluid line.

The conduit 12 defines a flow path 22 along which fluid to be measured can flow. In use, fluid flows in the fluid flow path 22 from left to right in the figure. Vortices generated in the fluid flow by the bluff body 14 are detected by the sensor tube 16. The operation of the sensor tube 16 is described in more detail below with reference to FIG. 2.

The sensor tube 16 is mounted to the housing 18 at a mounting point 24. The sensor tube 16 comprises a vortex sensing beam 26 extending in cantilever fashion from the mounting point 24 into the flow path 22, and a vibration sensing beam 28 extending in cantilever fashion from the mounting point 24 away from the vortex sensing beam 26. In use, the vortex sensing beam 26 senses external vibration applied to the vortex flowmeter 10 and also senses vortices shed from the bluff body, while the vibration sensing beam 28 senses only external vibration applied to the vortex flowmeter 10. An output signal generated by the vortex sensing beam 26 is combined with an output signal generated by the vibration sensing beam 28 to yield an overall output signal in which the effect of the external vibration is dramatically reduced.

As can be seen from FIG. 1, the vortex sensing beam 26 is recessed into a cavity 30 defined in the housing such that at least a portion of the vortex sensing beam is shielded from the fluid flow and a portion thereof projects into the fluid flow.

In the embodiment of the vortex flowmeter shown in FIG. 1, a temperature sensor 31 is also provided for determining the temperature of the fluid flow and a pressure sensor 32 is provided for determining the pressure of the fluid flow. The pressure sensor 32 communicates with the conduit 12 by means of a tube 34.

Figure 2:
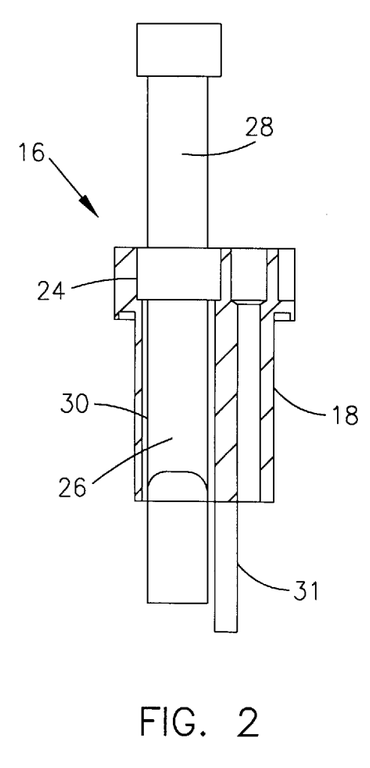
FIG. 2 is an enlarged partial cross-sectional view of the vortex flowmeter illustrated in FIG. 1.

An enclosure 36 is also provided for protecting the sensor tube 16 and pressure sensor 32 from the external environment. Electrical wires (not shown) exit the housing at a plug 38 and lead the outputs generated by the sensor tube 16, the temperature sensor 31 and the pressure sensor 32 to ancillary equipment for conversion to industry standard flowmeter output signals. FIG. 2 illustrates an enlarged view of the sensor tube 16 mounted in the housing 18.

Figure 3:
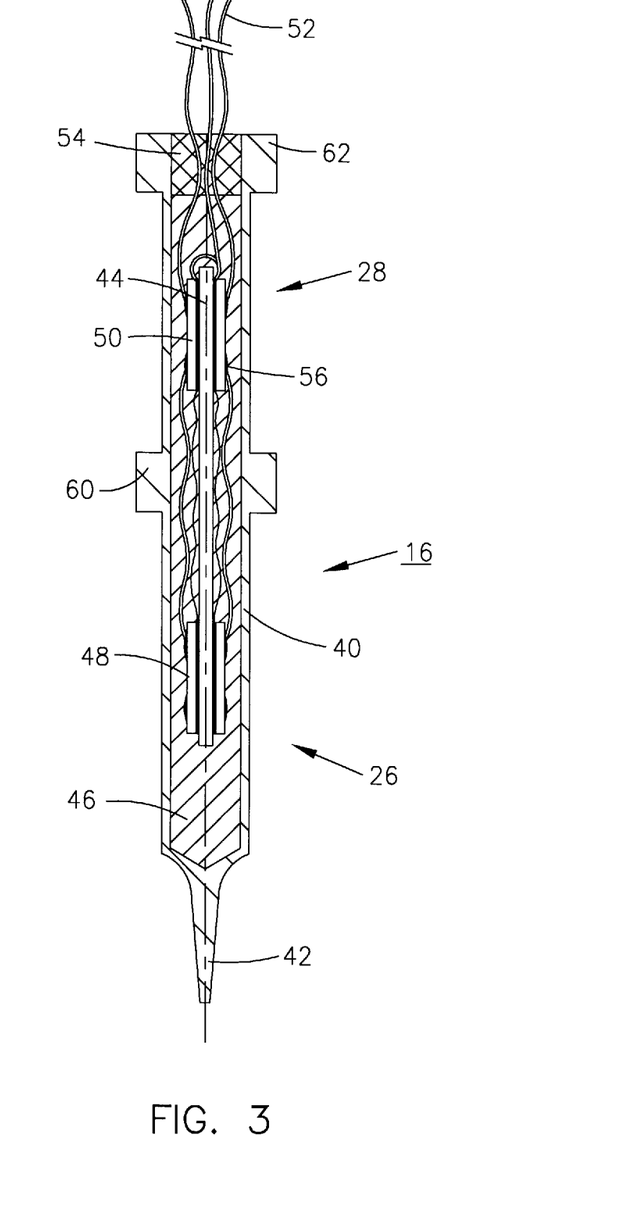
FIG. 3 is a longitudinal cross-sectional view of the vortex sensing beam illustrated in FIG. 2, as viewed in the direction of fluid flow.

Referring now to FIG. 3, the sensor tube 16 comprises a generally cylindrical tubular portion 40 which defines the outer surfaces of the vortex sensing beam 26 and the vibration sensing beam 28. The tubular portion 40 terminates at its one end in a detector tab 42 which extends into the flow path 22 as illustrated in FIG. 1. The tubular portion 40 defines an elongate cavity which extends through the vortex sensing beam 26 and the vibration sensing beam 28.

Located the cavity defined in the tubular portion 40 is a strain beam 44. The strain beam 44 is imbedded in the tubular portion 40 by means of a potting compound 46. The solid potting compound 46 ensures that any deflection of either the vortex sensing beam 26 or vibration sensing beam 28 about the mounting point 60 is transmitted from the tubular portion 40 to the strain beam 44.

A first piezoelectric sensor pair 48 are mounted to the strain beam 44 in the region of the vortex sensing beam 26. The first piezoelectric sensor pair 48 in conjunction with the strain beam 44 provides a means for detecting deflection of the vortex sensing beam 26. A second piezoelectric sensor pair 50 are mounted to the strain beam 44 in the region of the vibration sensing beam 28. The second piezoelectric sensor pair 50 in conjunction with the strain beam 44 provides a means for detecting deflection of the vibration sensing beam 28.

Each piezoelectric sensor pair 54, 56 is provided with electrically conductive pickup wires 52 which interconnect the piezoelectric sensors as discussed below with reference to FIG. 6, and which lead out of the sensor housing 40 through a moisture barrier 54. The pickup wires 52 are attached to the piezoelectric sensors by means of conductive adhesive 56.

The tubular portion 40, strain beam 44 and piezoelectric sensor pairs 54 and 56 function as a solid unit. Any deflection of the tubular portion 40 in the region of the vortex sensing beam 26 or the vibration sensing beam 28 is transmitted to the strain beam 44 by means of the potting compound 46. Accordingly, any deflection of the vortex sensing beam 26 in the plane of the figure is sensed by the first piezoelectric sensor pair 54, and any deflection of the vibration sensing beam 28 in the plane of the figure is sensed by the second piezoelectric sensor pair 56.

The sensor tube 16 is mounted to the housing 18 by means of mounting point 60 as shown in FIG. 2.

A balance mass 62 is provided at the end of the vibration sensing beam 28 to ensure that the vibration sensing beam 28 and the vortex sensing beam 26 deflect together in phase when external vibration is applied to the sensor tube 16.

From FIG. 3 it can be seen that the detector tab 42 merges gradually into the tubular portion 40. When the housing 18 is mounted to the conduit 12, as illustrated in FIG. 1, the tubular portion 40 containing the piezoelectric sensor pairs 50, 48 is located within the cavity 30 defined by the housing 18, while the detector tab 42 projects into the flow path 22.

With this arrangement, the bulkier tubular portion 40 is shielded from the fluid flow by means of its location in the cavity 30. Accordingly, the tubular portion 40 itself does not function as an additional bluff body to generate vortices in the fluid flow. Such secondary vortices would otherwise introduce unwanted deflections of the vortex sensing beam 26 into the operation of the vortex flowmeter.

Figure 4:
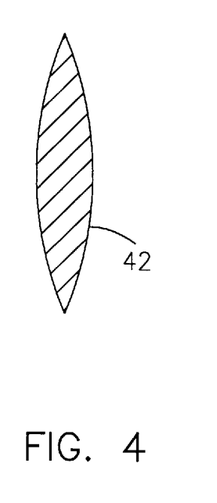
FIG. 4 is a transverse cross-sectional view of the detector tab of FIG. 3 along the plane B—B.

A transverse cross section of the detector tab 42 along plane B—B in FIG. 3 is shown in FIG. 4. As can be seen from the figure, the detector tab 42 has a streamlined aerofoil transverse cross sectional shape. This streamlined cross section as well as the relatively small frontal area that the detector tab presents to the oncoming flow, insures that the detector tab itself does not generate secondary vortices.

However, as can be seen from FIG. 2, the detector tab 42 presents a relatively larger surface area to passing vortices which have been generated by the bluff body 14. This insures that the vortex sensing beam 26 has adequate sensitivity to the passing vortices.

Figure 5A:
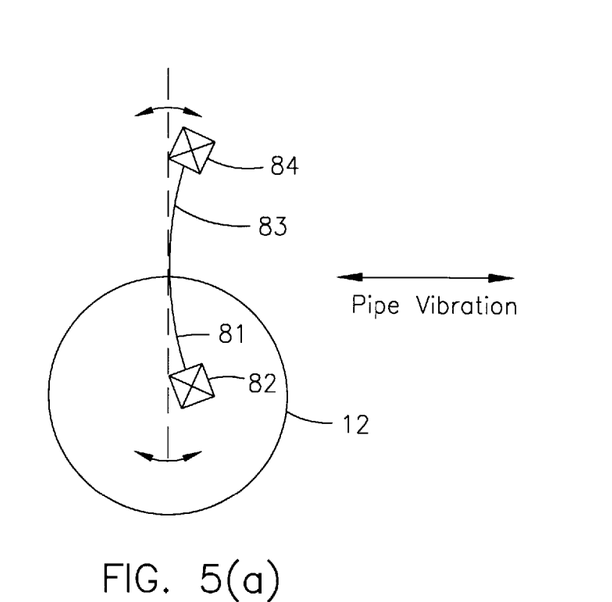
FIGS. 5(a) and 5(b) are schematic side views of the vortex flowmeter of FIG. 1 as viewed in the direction of fluid flow.
Figure 5B:
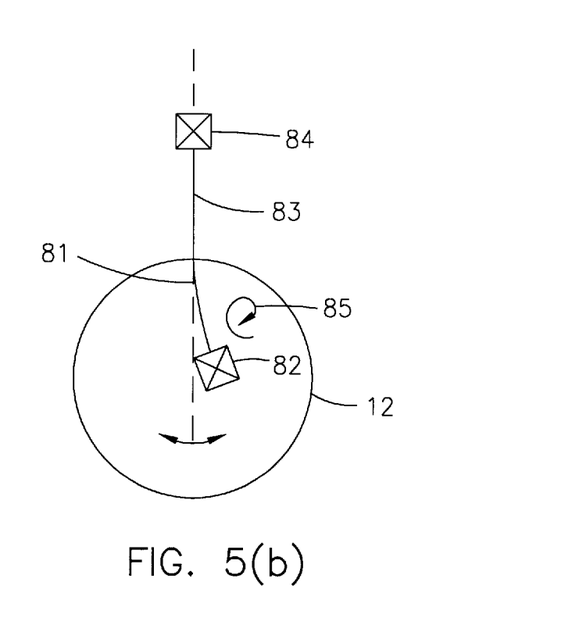

FIGS. 5(*a*) and 5(*b*) illustrate the operation of the sensor tube 10 in schematic form. These figures show a view looking down the conduit 12. For purposes of clarity, the housing 18 has been omitted from these figures. The vortex sensing beam has been represented schematically by a spring 81 and a mass 82, while the vibration sensing beam has been represented schematically by a spring 83 and a mass 84.

Under the influence of the external pipe vibration only, as shown in FIG. 4(*a*), both spring members 81 and 83 are deflected symmetrically by the inertial forces created by masses 82 and 84. The deflection of vortex sensing beam 26 is detected by the piezoelectric sensor pair 54, while the deflection of vibration sensing beam 28 is detected by the piezoelectric sensor pair 56.

Figure 6:
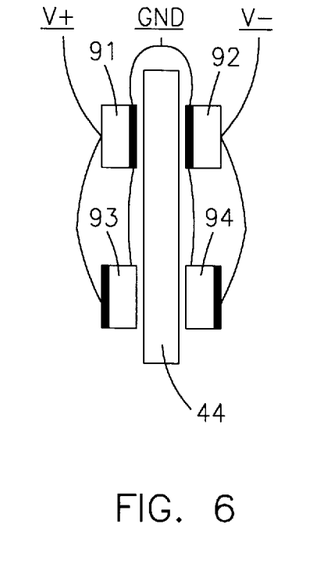
FIG. 6 is a schematic view of the strain beam and piezoelectric crystal interconnection of the vortex flowmeter of FIG. 1.

The piezoelectric sensor pairs are connected as shown in FIG. 6. In this figure, the strain beam 44 is shown with piezoelectric crystals 91, 92, 93 and 94 mounted thereto. The strain beam 44 is non-conductive, and the piezoelectric crystals are grounded on the sides nearest the strain beam 44 as shown.

Each piezoelectric crystal has a polarity which is shown by the dark bar along the edge of each crystal. The illustrated piezoelectric crystals have a positive output when they are compressed, i.e. a positive charge is created on the side of the crystal marked with the dark bar.

Under the deflection illustrated in FIG. 5(*a*), the output of crystals 91 and 93 would be −1 as they are both under tension. However, as they are connected with their polarities reversed, the nett output at the V+ line would be zero. Similarly, the output of crystals 92 and 94 would be +1 as they are both under compression. However, as they are connected with their polarities reversed, the nett output of the vortex flowmeter 10 is zero.

This direct cancellation of vibration induced signals has the advantage of eliminating the need for intervening electrical components which may add nonlinearities such as finite saturation voltages, which would compromise the vibration rejection of the vortex flowmeter 10.

FIG. 5(*b*) illustrates a situation where there is no external pipe vibration applied to the sensor tube 10. In this figure, there is fluid flowing along the flow path and accordingly, vortices are passing vortex sensing beam 26. As a vortex 85 passes the vibration sensing beam 26, a low pressure region is created adjacent to the vortex sensing beam 26. This low pressure area causes the vortex sensing beam 26 to deflect towards the vortex 85 as shown, while the vibration sensing beam 28 remains undeflected.

Referring again to FIG. 6, such a situation creates substantially no signal from crystals 91 and 92. Crystal 93, under tension, gives an output of −1 unit while crystal 94, under compression, gives an output of +1 unit. This in turn creates an output of −1 unit at the V+ line and a +1 unit output at the V− line, for a total differential output of magnitude 2.

In operation, the vortex sensor is of course subjected to external vibration at the same time as being subjected to passing vortices. In this situation, the effects described with reference to FIGS. 4(*a*), 4(*b*) and 5 take place cumulatively, to yield a final output signal in which the effects of external vibration are substantially reduced. This results in an increase in the sensitivity and usable range of the vortex flowmeter.

In order to covert the output signal from the vortex flowmeter into an analog signal in the industry standard 4 to 20 mA range, signal conditioning electronics are used. While the signal conditioning electronics do not form part of the invention, they will be discussed briefly for purposes of completeness.

Figure 7:
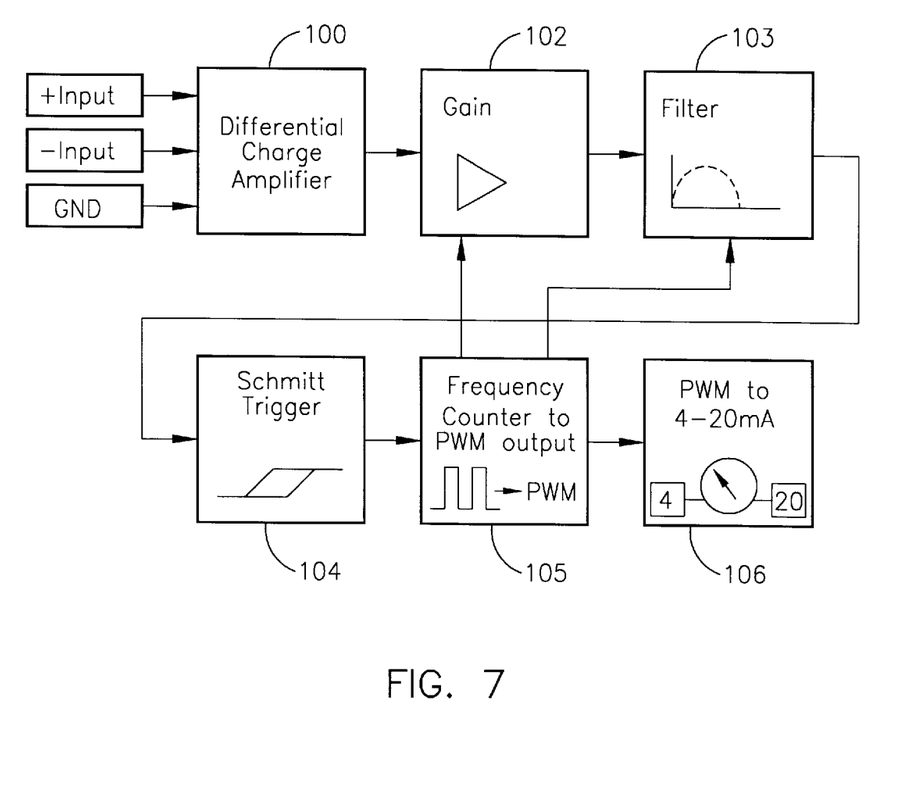
FIG. 7 is a block diagram of the ancillary equipment required to covert the output from the flowmeters illustrated in FIGS. 1 and 7 into the industry standard output.

The preferred configuration of the signal conditioning apparatus is shown in FIG. 7.

The first stage of the signal conditioning electronics is an amplifier 100 which amplifies the charges generated in the piezoelectric crystals. The amplifier 100 is a differential charge amplifier and it will thus reject common-mode signals. This results in the signal conditioning electronics having good immunity to electrical power line 60 Hz noise as well as other electrical noise generated by nearby equipment. The sensor and the amplifier 100 are earth grounded, providing additional noise immunity.

The next stage of the signal conditioning equipment is a gain stage 102. While the frequency of the output from the vortex flowmeter 10 is proportional to the velocity of the fluid flow, the magnitude of the output varies with the square of the velocity of the fluid flow. This results in a large variation in the signal from the piezoelectric crystals, and corresponds directly to the turn down of the vortex flowmeter 10.

The next stage is a filter 103, which provides additional noise immunity and helps prevent additional and missing pulses. The signal is then passed to a Schmitt trigger 104 which turns slow-rising analog signals into sharp-edged digital pulses. The sharp pulses are required for the proper operation of the digital frequency counter used in the next stage.

The next stage is a combination digital frequency counter and pulse-width modulation signal converter 105. The digital frequency counter is used to determine the output frequency of the flowmeter from the sharp edged pulses provided by the Schmitt trigger 104. This output frequency is then converted to a pulse-width-modulated signal.

The final stage of the signal processing electronics is a converter 106 which converts the pulse-width-modulated signal to the 4 to 20 mA output which is the industry standard. This allows the final output to be used by analog and digital gauges, distributed control systems, and other plant instrumentation devices.

Figure 8:
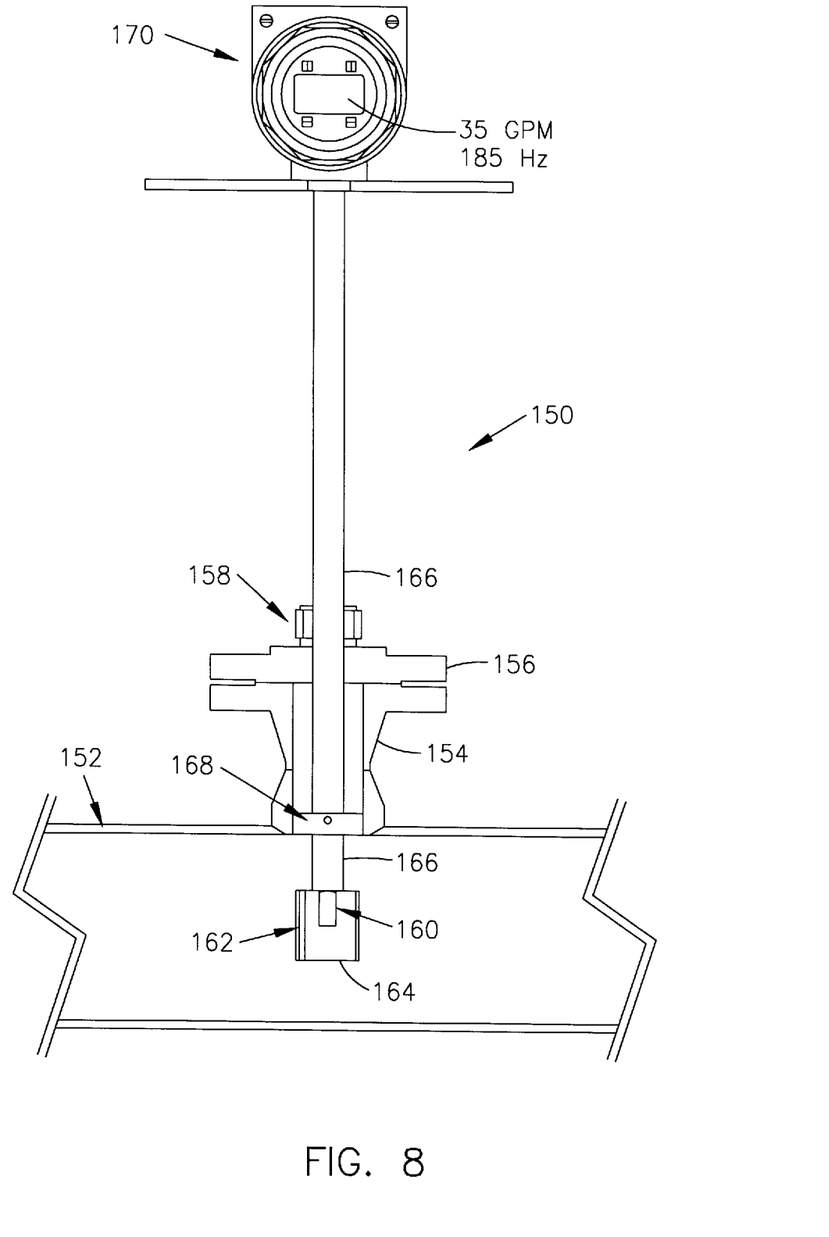
FIG. 8 is a partial cross sectional view of an insertion vortex flowmeter according to the invention.

A second embodiment of a vortex flowmeter according to the invention is illustrated in FIG. 8. In this embodiment, the vortex flowmeter is in the form of an insertion device which can conveniently be used in existing pipe networks without the need for replacing a section of the pipe, as with the vortex flowmeter configuration described with reference to FIG. 1.

In this embodiment, the vortex flowmeter, generally indicated by the numeral 150, is inserted into a pipe 152 through an existing access point 154 by means of a closure 156 having a compression fitting 158. Alternatively, a packing gland may be used in place of the compression fitting 158.

The vortex flowmeter 150 includes a sensor tube 160 which has the same structure as the vortex sensor 16 of FIGS. 1 and 3, and a bluff body 162. The bluff body 162 is mounted to a circular tubular flow conditioner 164 which services to provide uniform flow conditions around and between the bluff body 162 and the sensor tube 160. A housing 166 is provided for mounting the sensor tube 160 and the flow conditioner 164. The housing 166 is removably coupled to the conduit 152 by means of the closure 156 and compression fitting 158.

A flow conditioning plug 168 is provided around the housing 166 in the form of a cylindrical collar. The surface of the flow conditioning plug 168 which faces into the conduit 152 is shaped to conform to the inner radius of the conduit 152, so that the fluid flow in the conduit is undisturbed as far as possible by the presence of the fitting 154 and the cavity defined by the fitting 154. The flow conditioning plug 168 therefore also serves to provide more uniform flow conditions in the conduit 152 in the region of the vortex flowmeter 150. This increases the overall accuracy of the vortex flowmeter 150. The flow conditioning plug 168 is removable, and is preferably provided as part of a set of flow conditioning plugs of different sizes to fit different fittings 154 and with different profiled faces to fit different conduit diameters.

A display housing 170 houses signal processing electronics and provides a convenient output of flowrate and vortex frequency. Connectors (not shown) are also provided for connecting the vortex flowmeter output lines to process control equipment, data capture devices, etc.

Figure 9A:
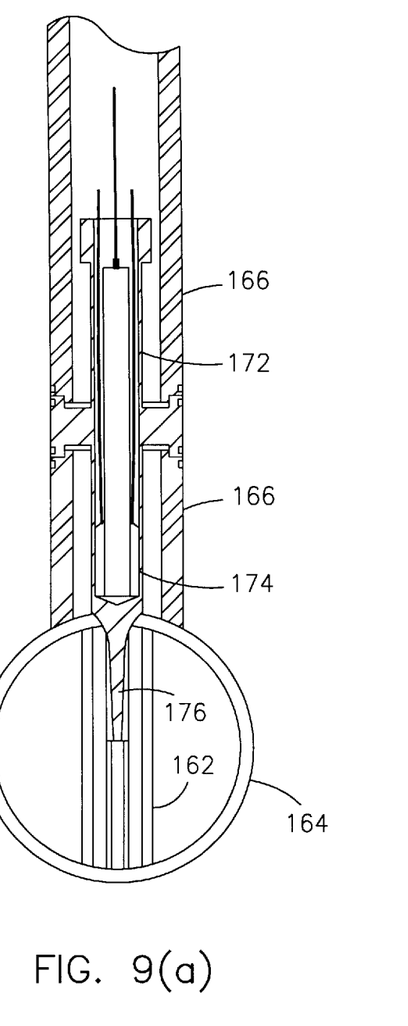
FIGS. 9(A) and 9(b) are partial cross sectional front and side views of the insertion vortex flowmeter of FIG. 8.
Figure 9B:
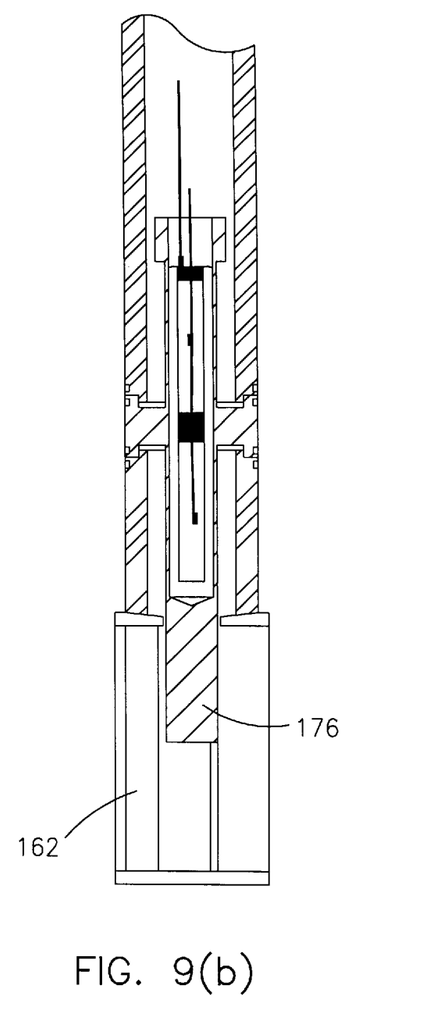

As can be seen from FIGS. 9(*a*) and (*b*), the structure of the sensor tube is identical to that of the sensor tube 16. The vibration sensing beam 172 is again isolated from the fluid flow, and the housing 166 serves to shield the bulkier portions of the vortex sensing beam 174 from the fluid flow.

The bluff body 162, shown schematically in FIG. 8, and in detail in FIGS. 9(*a*) and 9(*b*) is T-shaped in transverse cross section, with the head of the T-shape facing upstream. The sensor tab 176 of the vortex sensing beam 174 is located in a cutout of the leg of the T-shape, and is thus in close proximity to the bluff body 162. It will, however, be appreciated that the vortex sensing beam 174 remains functionally separate from the bluff body 162.

Figure 10:
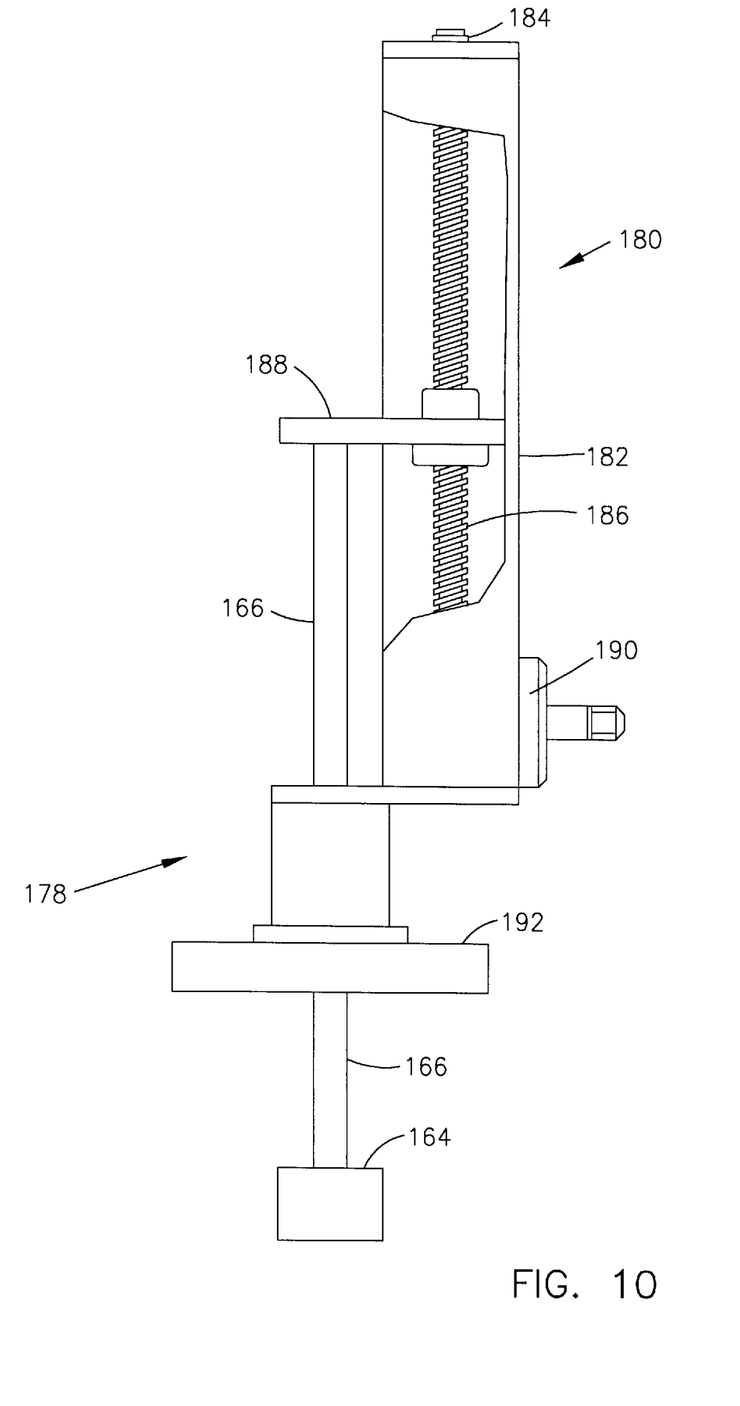
FIG. 10 is a partially cutaway side view of a modified version of the insertion vortex flowmeter of FIGS. 8 and 9.

A modified version of the insertion vortex flowmeter of FIGS. 8 and 9 is shown in FIG. 10, generally indicated by the numeral 178. In this version of the insertion flowmeter, the sensor tube 16, the bluff body 162, the flow conditioner 164, and the housing 166 are unchanged from the FIGS. 8 and 9 insertion flowmeter, but a positioning mechanism 180 is provided in addition to these components.

The positioning mechanism 180 is used to adjustably position the flow conditioner 164, the bluff body (not shown) and sensor tube (not shown) at a desired transverse location in a conduit.

The positioning mechanism 180 includes an enclosure 182 which has a bearing 184 mounted at each end thereof. A threaded rod 186 is rotatably mounted in the enclosure 182 by means of the bearings 184. An internally threaded carrier plate 188 is threaded onto the rod 186, and is fixedly attached to the housing 166 as shown. Mounted in the lower end of the enclosure 182 is a bevel gear arrangement 190 whereby the threaded rod may be rotated by means of a crank (not shown) or the like, thereby to traverse the carrier plate 188 towards or away from the conduit as desired, depending on the rotation of the threaded rod 186.

In use, the flowmeter 178 is mounted to an access point in a conduit by means of a flange 192. Using the bevel gear arrangement 190, the threaded rod 186 is rotated as desired to position the flow conditioner 164, the sensor tube and bluff body at a chosen location in the conduit.

The position of the flow conditioner 164 in the conduit is determined by referring to a scale marked on the enclosure 166. By noting the initial position of the carrier plate 188 relative to this scale, the distance that the flow conditioner (an hence the bluff body and the sensor tube) has been moved relative to the conduit can be determined.

The insertion mechanism 180 may be permanently mounted to the conduit, or it may be removable and thus used with a number of different vortex flowmeters.

It will be appreciated that the invention is not limited to the embodiment of the invention described above, and many modifications are possible without departing from the spirit and scope of the invention.

I claim:

1. A vortex flowmeter for use in a conduit defining a fluid flow path, comprising:

a bluff body for extending across the conduit to generate vortices in a fluid flow;

a housing being coupleable to the conduit;

a vortex sensing beam coupled to the housing and extending in cantilever fashion from the housing into the flow path in use and being separate from the bluff body, the vortex sensing beam including strain detecting means located therein for sensing external vibration and for sensing vortices shed from the bluff body; and a vibration sensing beam coupled to the housing and extending in cantilever fashion away from the vortex sensing beam outside the flow path, the vibration sensing beam including strain detecting means located therein for sensing external vibration, wherein the vortex sensing beam is recessed into the housing such that a deflectable part of the vortex sensing beam including the strain detecting means is shielded from the fluid flow.

2. A vortex flowmeter according to claim 1 wherein the part of the vortex sensing beam projecting into the fluid flow comprises only a streamlined tab.

3. A vortex flowmeter according to claim 2 wherein the vortex sensing beam and the vibration sensing beam together comprise:

an elongated sensor tube coupled at a midpoint thereof to the housing; and wherein the strain detecting means comprises piezoelectric crystals mounted to a strain beam which is potted into the sensor tube for detecting deflection of the tube about the midpoint thereof.

4. A vortex flowmeter for use in a conduit defining a fluid flow path, comprising:

a bluff body for extending across the conduit to generate vortices in a fluid flow;

a housing being coupleable to the conduit;

an elongated sensor tube separate from the bluff body and being mounted to the housing at a midpoint of said sensor tube, the sensor tube defining a vibration sensing beam extending in cantilever fashion from the midpoint into the flow path in use, the vortex sensing beam for sensing external vibration and for sensing vortices shed from the bluff body, the sensor tube further defining a vibration sensing beam extending in cantilever fashion from the midpoint away from the vortex sensing beam, the vibration sensing beam for sensing external vibration;

first sensing means for sensing deflection of the vortex sensing beam and for providing a first output signal corresponding to said vortex sensing beam deflection;

second sensing means for sensing deflection of the vibration sensing beam and for providing a second output signal corresponding to said vibration sensing beam deflection; and, means for combining the first and second signals to provide a vortex flowmeter output signal with improved vibration isolation, wherein the midpoint of the sensor tube is mounted in a recess defined in the housing such that in use a deflectable part of the vortex sensing beam in which the first sensing means is located is positioned in the recess and is shielded from the fluid flow.

5. A vortex flowmeter according to claim 4 wherein:

the sensor tube further comprises a strain beam potted into a cavity defined in the sensor tube;

the first sensing means comprises a first pair of piezoelectric crystals mounted to the strain beam in the vortex sensing beam;

the second sensing means comprises a second pair of piezoelectric crystals mounted to the strain beam in the vibration sensing beam; and the means for combining the first and second signals comprise electrical conductors connecting the first and second pairs of piezoelectric crystals with opposed polarities.

6. A vortex flowmeter according to claim 5 wherein only a streamlined tab of the vortex sensing beam projects into the fluid flow.

* * * * *

UNITED STATES PATENT AND TRADEMARK OFFICE
CERTIFICATE OF CORRECTION

PATENT NO : 5,869,772
DATED : Feb. 9, 1999
INVENTOR(S): William James A. Storer

It is certified that error appears in the above-identified patent and that said Letters Patent is hereby corrected as shown below:

On the title page:
   Item [22] delete [June 24, 1997] and insert --Nov. 27, 1996 --

Signed and Sealed this

Twenty-third Day of November, 1999

Attest:

Q. TODD DICKINSON

Attesting Officer

Acting Commissioner of Patents and Trademarks